United States Patent

[11] 3,549,923

| [72] | Inventors | Alexandr Sergeevich Kurakin<br>Oktyabrsky prospekt, 5, kv. 50, Voronezh;<br>Fedor Mikhailovich Juferov,<br>Energeticheskaya ulitsa, 8, korpus 1, kv.<br>104, Moscow, U.S.S.R. |
|---|---|---|
| [21] | Appl. No. | 723,116 |
| [22] | Filed | Apr. 22, 1968 |
| [45] | Patented | Dec. 22, 1970 |

[54] LOW-SPEED SYNCHRONOUS ELECTRIC MOTOR
2 Claims, 8 Drawing Figs.

| [52] | U.S. Cl. | 310/162, 310/154, 310/266 |
|---|---|---|
| [51] | Int. Cl. | H02k 21/00 |
| [50] | Field of Search | 310/162, 266, 154, 181, 67 |

[56] References Cited
UNITED STATES PATENTS

| 2,757,299 | 7/1956 | Turner | 310/266 |
| 2,847,594 | 8/1958 | Cohen | 310/266 |
| 3,090,571 | 5/1963 | Lohest | 310/266 |
| 3,121,851 | 2/1964 | Packard | 310/266 |
| 3,289,019 | 11/1966 | Buchhold | 310/266 |
| 3,310,697 | 3/1967 | Lace | 310/154 |

Primary Examiner—Milton O. Hirshfield
Assistant Examiner—R. Skudy
Attorney—Waters, Roditi, Schwartz & Nissen ABSTRACT: A low-speed synchronous electric motor with electromagnetic speed reduction comprises internal and external stators arranged within a motor frame and having facing surfaces with an equal number of slots which are open approximately for one-half of the tooth pitch. An AC winding is fitted in the slots of the external stator and a hollow thin wall cylindrical rotor is placed in the annular gap between the internal and external stators. The hollow rotor has a base made of a nonmagnetic material into the surface of which ferromagnetic laminations are embedded to constitute teeth.

LOW-SPEED SYNCHRONOUS ELECTRIC MOTOR

The present invention relates to synchronous electric motors and, in particular, to low-speed synchronous electric motors provided with electromagnetic reduction of the speed of rotation of the motor shaft.

Known in the art is a low-speed synchronous electric motor with electromagnetic speed reduction comprising a stator and rotor, the facing surfaces of which have open slots for separating out the stator and rotor toothed harmonics of the motor magnetic fields.

The magnetic fields of the stator are excited by two stator windings which have a different number of poles and are connected to different sources of supply.

Electromagnetic speed reduction is brought about in the above-mentioned electric motor by the interaction of the rotor and stator toothed harmonics.

The known synchronous electric motor has following inherent disadvantages:
- large size due to the arrangement of two windings on the stator of the motor;
- poor utilization of the electromagnetic characteristics of the active material of the machine since the range of toothed harmonics of the magnetic field is not fully used for the working fields; and
- low speed of response due to the considerable moment of inertia of the rotor.

A primary object of the present invention is to eliminate the above-mentioned disadvantages.

A further object of the present invention is to provide a low-speed synchronous electric motor with improved power characteristics, smaller size and weight, a higher speed of response and a smaller requirement of copper material.

These and other objects are attained by a low-speed synchronous electric motor, wherein the facing surfaces of the external and internal stators have an equal number of open slots, whereas the hollow rotor is, essentially, a thin-walled metal cylinder with ferromagnetic teeth and longitudinal slits in the form of open slots.

It is advisable to make the cylinder of a ferromagnetic material.

As an alternative, the cylinder may be made of a nonmagnetic metal and its surface can be lined with ferromagnetic platelets constituting teeth.

The internal stator may have a field winding or may be a permanent magnet with a ferromagnetic toothed rim.

The present invention will further be described by way of example with reference to the following drawing, wherein:

FIG. 5b is a sectional view taken on line Vb–Vb in FIG. 5a;

FIG. 6b is a sectional view taken along line VIb–VIb in FIG. 6a.

Figure 1:
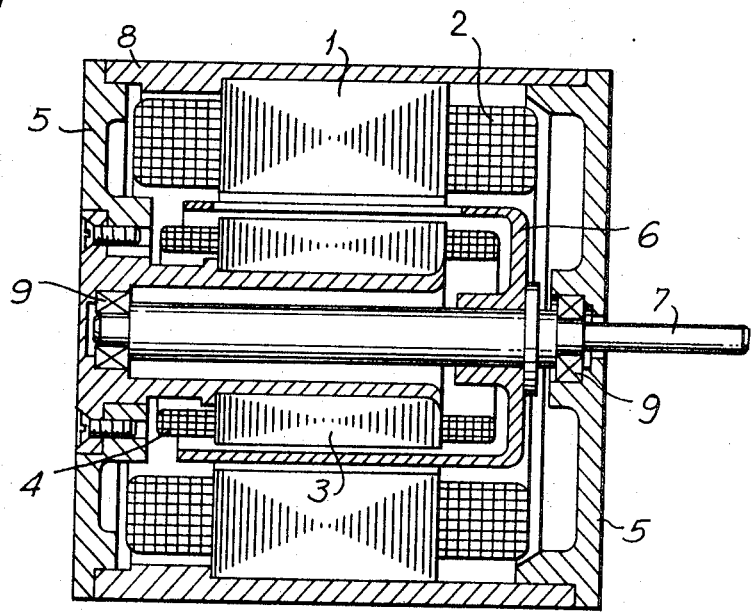
FIG. 1 is a sectional view of a synchronous electric motor in accordance with the present invention.

The electric motor shown in FIG. 1 comprises an external stator 1, a winding 2, an internal stator 3 build up of electrical steel laminations insulated from one another and with open slots provided on its outside surface, field winding 4 and fixed to bearing endshields 5, a hollow ferromagnetic toothed rotor 6 fixed to a metal shaft 7 that rotates freely inside the stationary internal stator, a frame 8 and bearings 9.

Windings 2 and 4 of stators 1 and 3 have a different number of poles $P_1$ and $P_2$. The number of poles of windings 2 and 4 are selected in such a manner that no direct transformer coupling is established between them. An equal number of open slots $Z_1$, is provided on the internal and external stator surfaces that face each other. The number of open slots $Z_2$ of rotor 6 is determined from the following equation:

$$Z_2 = [Z_1 + (P_1 \pm P_2)] \quad \quad (1)$$

The open slots of stators 1 and 3 and rotor 6 serve for distorting the magnetic field excited by windings 2 and 4 of internal and external stators 3 and 1 and for separating out the toothed harmonics of the fields of stators 1 and 3 and rotor 6. The interaction of these toothed harmonics ensures synchronous operation of the electric motor at a low speed of rotation equal to:

$$n = \frac{60f}{Z_2} \text{ r.p.m.} \quad \quad (2)$$

According to equation (1), maximum utilization of the active material of the machine is provided. The arrangement of two windings 2 and 4 on internal and external stators 3 and 1 provides for better utilization of the machine space and enables reduction of its size.

The use of hollow rotor 6 allows an increase in the speed of response of the machine as it has a small moment of inertia.

The motor is started by an induction torque set up as a result of the interaction of the eddy currents of hollow rotor 6 with the magnetic field of winding 2.

Figure 2:
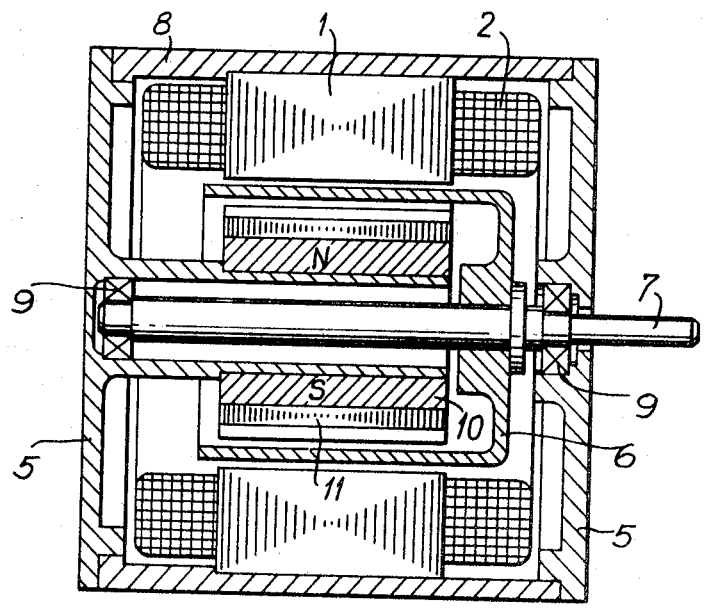
FIG. 2 is a sectional view of a modified synchronous electric motor in accordance with the present invention.

The electric motor shown in FIG. 2 differs from that in FIG. 1 in that its internal stator comprises a permanent magnet 10 and toothed ferromagnetic rim 11. The number of poles of winding 2 and permanent magnet 10 are selected so that magnet 10 is not demagnetized. The number of slots $Z_1$ of the internal and external stators, the number of slots $Z_2$ of rotor 6 and the number of pairs of poles $P_1$ of winding 2 and $P_2$ of permanent magnet 10 are to comply with equation (1) at which maximum utilization is obtained of the machine active material.

The employment of permanent magnet 10 provides improvement in the power characteristics of the machine and reduces the amount of copper material required.

Figure 3:
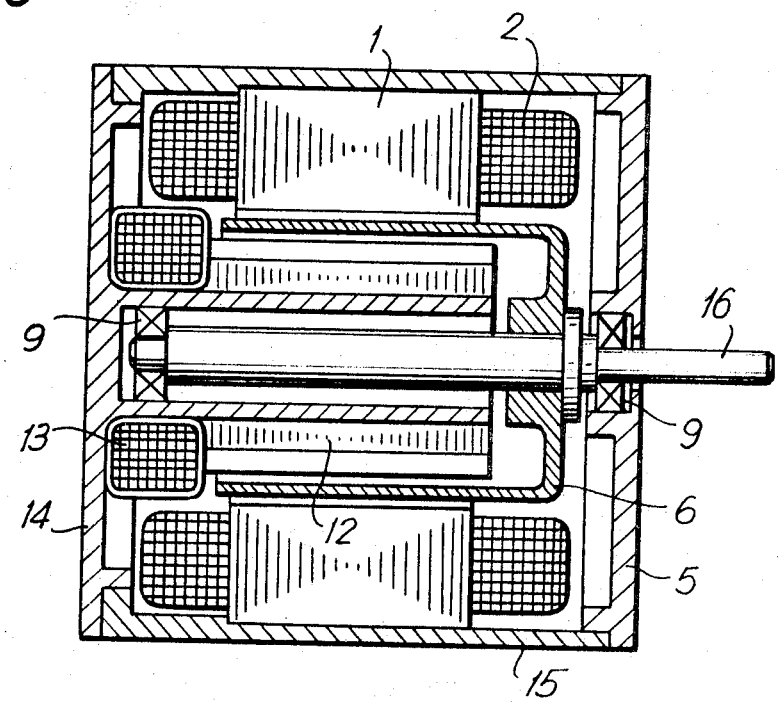
FIG. 3 is a sectional view of another embodiment of a synchronous electric motor in accordance with the present invention.

The electric motor shown in FIG. 3 differs in that the toothed core of internal stator 12 is excited along the axis by annular winding 13 which is in axial alignment with internal stator 12; this mode of excitation enables reduction of the required magnetizing force of internal stator winding 12, and makes better use of the energy of the toothed fields excited by this winding while improving the power characteristics of the machine.

External and internal stators 1 and 12 have an equal number of open slots $Z_2$. The number of open slots $Z_2$ of rotor 6 are determined from the following equations at which better utilization of the machine is ensured.

$$Z_2 = Z_1 + P \quad \quad (3)$$

where is the number of pairs of poles of winding 2.

Annular winding 13 may be arranged on one or two bearing endshields 14. An axial magnetic symmetry of the machine and better utilization of its space are attained by arrangement of annular winding 13 on two endshields 14. Bearing endshields 14 and frame 15 are made of a ferromagnetic material for conducting the magnetic flux of winding 13, whereas shaft 16 is made of a nonmagnetic material for reducing the stray induction of winding 13.

Figure 4:
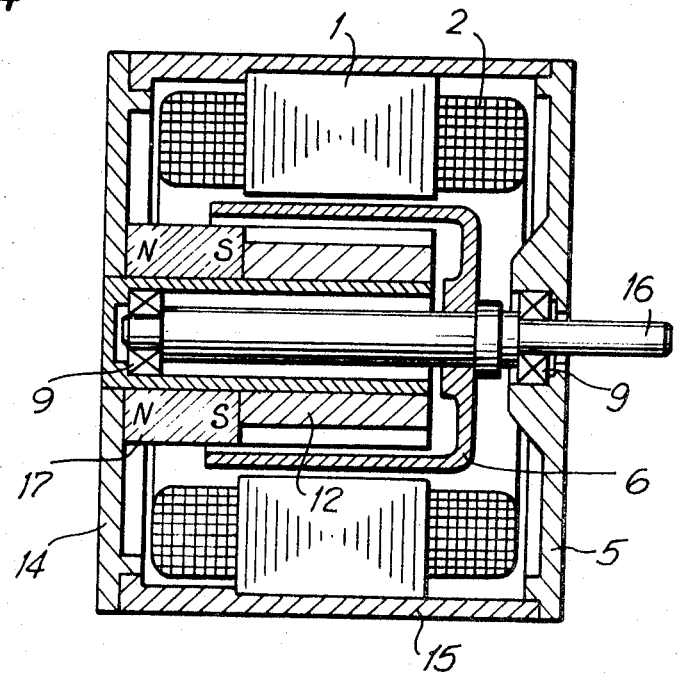
FIG. 4 is a sectional view of another embodiment of a synchronous electric motor in accordance with the present invention.

The electric motor shown in FIG. 4 differs in that the toothed core of internal stator 12 is excited by axially magnetized permanent magnet 17, thus enabling improvement in the power characteristics of the machine, and reduction in the amount of copper material required.

Figure 5A:
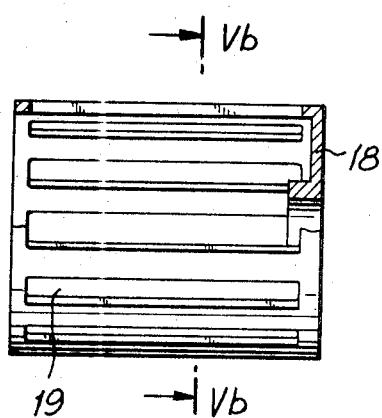
FIG. 5a is a side view partly in section of a hollow rotor in accordance with the present invention.
Figure 5B:
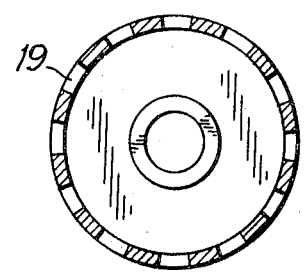

The hollow rotor shown in FIGS. 5a and 5b is a hollow thin wall ferromagnetic cylinder 18 the surface of which has through slots 19 in the form of openings. The rotor slots serve for separating out the working toothed fields of the machine magnetic field. The use of thin walls for cylinder 18 allows reduction in the moment of inertia of the rotor (not shown in the drawing) and increase in the speed of response of the electric motor.

Figure 6A:
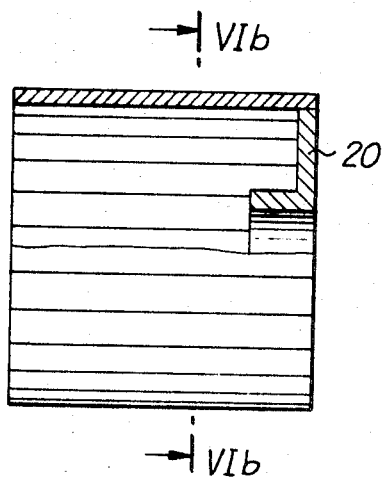
FIG. 6a is a side view partly in section of another embodiment of a hollow rotor in accordance with the present invention.
Figure 6B:
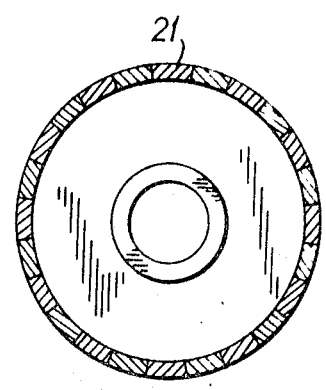

Hollow rotor 20 shown in FIGS. 6a and 6b differs in that it is made of aluminum or its alloys and its surface is lined with ferromagnetic platelets 21 which serve as teeth. The thickness of the platelets is equal to that of the cylinder wall, and their width is approximately equal to one-half of the unit interval of the rotor teeth.

The employment of a hollow cylinder made of nonmagnetic material and lined with ferromagnetic platelets enables to reduction in the stray induction of winding 2, improvement in the utilization of the machine active material and increase in the starting torque as the cylinder is made of aluminum or its alloys.

Low-speed synchronous electric motors with electromagnetic speed reduction may be employed to provide a low-speed high-response synchronous drive in automatic control and radioelectronic devices, tape recorders, as well as time relays and other instruments where a high reliability and long service life of the electric motor is required.

We claim:

1. A low-speed synchronous electric motor with electromagnetic speed reduction comprising a motor frame with bearing end shields, internal and external stators arranged within said frame and having facing surfaces with an equal number of slots which are open approximately for one-half of the tooth pitch, an AC winding fitted in the slots of said external stator, and a hollow thin-wall cylindrical rotor in an annular air gap between said internal and external stators, said hollow rotor having a base made of a nonmagnetic material with ferromagnetic laminations embedded in the surface thereof, said laminations constituting teeth, said internal stator being in the form of a permanent magnet with a ferromagnetic toothed rim.

2. A low-speed synchronous electric motor with electromagnetic speed reduction comprising a motor frame with bearing endshields, internal and external stators arranged within said frame and having facing surfaces with an equal number of slots which are open approximately for one-half of the tooth pitch, an AC winding fitted in the slots of said external stator, a hollow thin-wall cylindrical rotor in an annular air gap between said internal and external stators, said hollow rotor having a base made of a nonmagnetic material with ferromagnetic laminations embedded in the surface thereof, said laminations constituting teeth, and an axially magnetized permanent magnet for exciting said internal stator.